Aug. 25, 1931.  R. C. ZUCKERMAN  1,820,040
PROTECTING ENVELOPE FOR TREES
Filed May 8, 1929     2 Sheets-Sheet 1
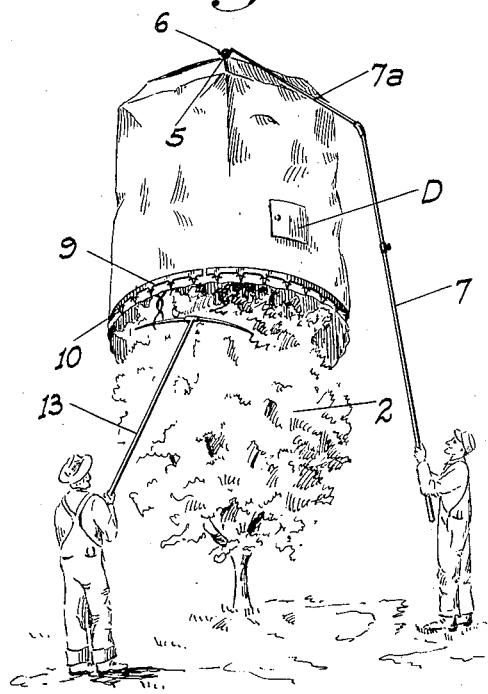
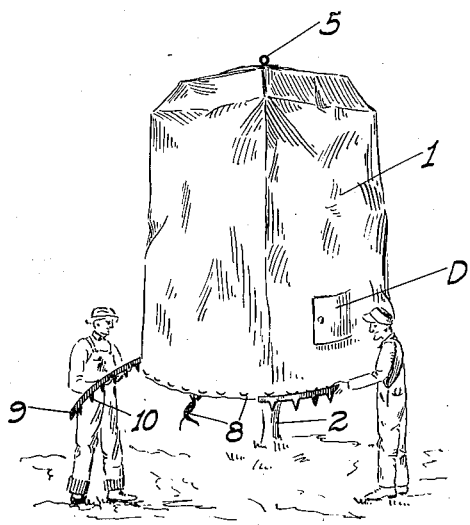
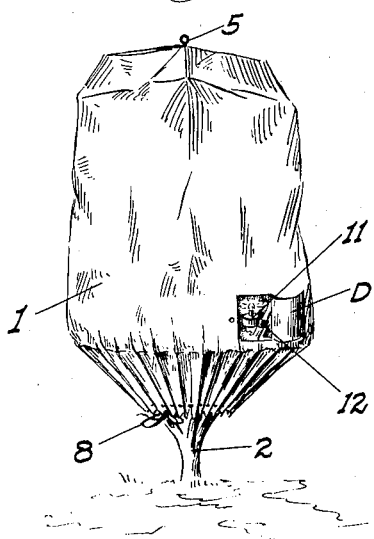
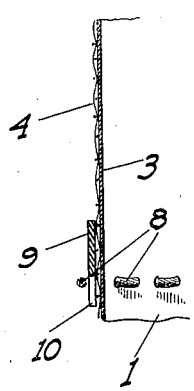
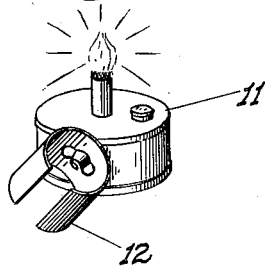
INVENTOR
R. C. Zuckerman
BY *(signature)*
ATTORNEY

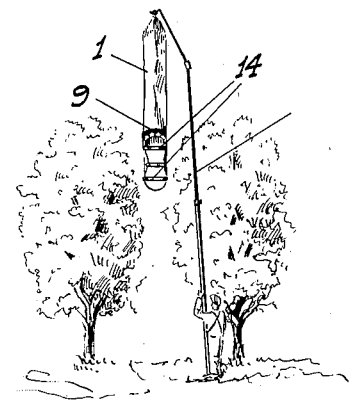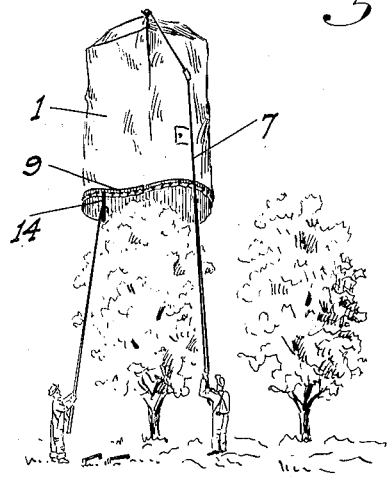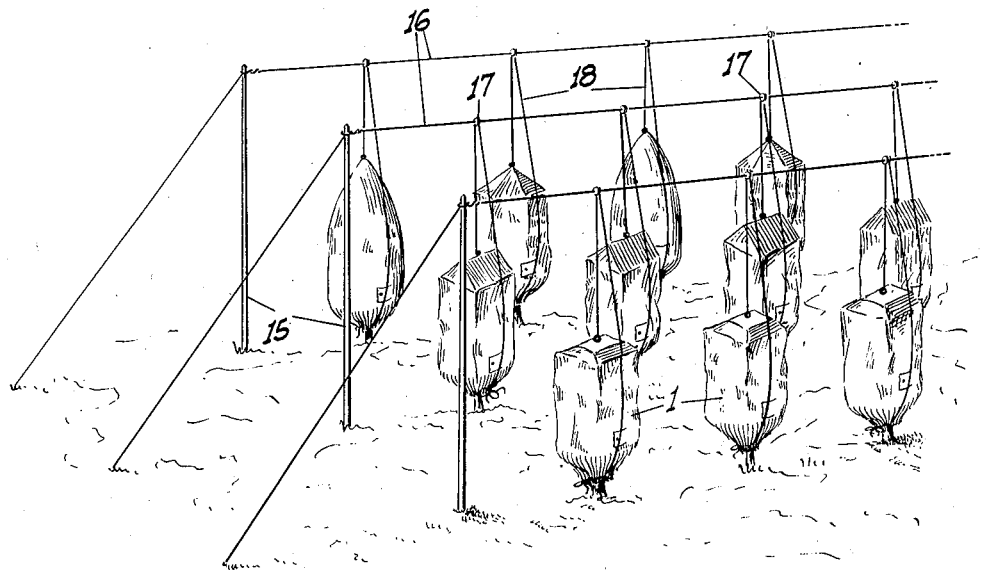

Patented Aug. 25, 1931

1,820,040

UNITED STATES PATENT OFFICE

ROSCOE C. ZUCKERMAN, OF STOCKTON, CALIFORNIA

PROTECTING ENVELOPE FOR TREES

Application filed May 8, 1929. Serial No. 361,363.

This invention relates to means for protecting fruit trees from damage due to frost, my principal object being to provide an envelope for each tree adapted to completely surround the foliage and fruit bearing area thereof so that the frosty air cannot contact with the fruit; and yet which is of such a nature that light and heat from the sun will be imparted to the tree to promote the growth of the fruit even when still enveloped in the protective covering. With the use of this device therefore it is not necessary for the envelope to be placed on the tree every night and removed every morning. Instead it can be left on the tree undisturbed for the duration of a spell of frosty weather.

A further object is to provide an envelope which will be of a flexible and readily foldable nature so that it may be easily handled and kept in a compact space when not in use, and so that its lower end or mouth may be pulled or contracted so as to extend snugly about the trunk of the tree below the foliage, thus adding of course to the protection afforded by the use of this device.

I have also provided detachable means for enabling the mouth of an envelope to be held wide open when the same is being placed over a tree so that it may be readily lowered into position without interfering with the foliage or limbs. Such means is also of such a nature that it may be initially confined within narrow limits so as to enable the envelope to be manipulated and raised into position over a tree from between adjacent trees even when the trees are somewhat close together, as is very frequently the case.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views;

Fig. 1 is a fanciful view showing an envelope as being hoisted into a superimposed position relative to a tree.

Fig. 2 is a similar view after the envelope has been lowered about the tree showing the mouth expanding element in the process of being removed.

Fig. 3 is a perspective view of the envelope in its final tree protecting position.

Fig. 4 is an enlarged fragmentary vertical section of the envelope at the bottom.

Fig. 5 is a perspective view of a heat creating lamp adapted for placement within the envelope and to be supported by the tree.

Figs. 6 and 7 are fanciful perspective views illustrating the manner of manipulation of the device when the trees are close together.

Fig. 8 is a perspective view of a modified arrangement of envelopes usable in connection with trees of such height as to render the hand manipulation of the envelopes unfeasible.

Referring now more particularly to the characters of reference on the drawings, and particularly at present to Figs. 1 to 5 the envelope 1 is of any desired and suitable form so as to be foldable and of such dimensions as to completely surround the tree 2 with which it is to be engaged and to extend from the top of the tree to a point below the lowermost branches and foliage. The envelope is preferably formed of a flexible tough yet relatively light grade of paper 3 treated so as to be waterproof, non-porous and translucent. Embedded in or otherwise applied to the paper over its entire area is a wide mesh fabric 4 which serves to strengthen the paper against tearing without destroying its flexibility or translucent character. The envelope is closed on top and is there provided with a centrally disposed eye or ring 5 for detachable engagement with the hook 6 provided on the upper end of a pole 7, which is preferably of a telescopic nature so that its length may be altered and formed with an angularly extending portion 7a toward its upper end, as shown in Fig. 1.

This enables the envelope to be raised into position directly above the tree to be enveloped by an operator standing to one side of the tree as shown.

A draw cord 8 is mounted in connection with the envelope adjacent its lower end or mouth, said cord being alternately passed through the envelope from the exterior to the interior and vice-versa so as to form a number of loops about the outside of the same as shown. The length of this cord is sufficient to enable the mouth to be fully open while still permitting the ends of the cord to be tied together as illustrated in Fig. 2. Before raising the envelope into place a spring band 9 having a number of depending lugs 10 to detachably pass between the envelope and the different exterior loops of the cord, is mounted in connection with the envelope, the length of the band being substantially equal to the full circumference of the envelope at the mouth.

An air heating device may be mounted in close connection with the tree if necessary, and so as to be also enclosed by the envelope. The device in the form here shown comprises an oil lamp 11 of suitable character which is provided with a spring clip 12 adjustably mounted on one side thereof and adapted to frictionally engage a limb of the tree in any suitable location; the adjustability of the clip relative to the lamp enabling the latter to be maintained on a level regardless of the angularity of the limb with which the clip may be engaged. To enable the lamp to be reached for adjustment, inspection or refilling without disturbing the envelope, the latter has a flap-door D in one side, the lamp being inserted into place through the door after the envelope is in place so it is in proper position relative to the door.

The envelope having been raised above a tree by an operator manipulating the pole 7, said envelope is then lowered about the tree, while another operator stands by with a branch or foliage deflecting implement 13 as shown in Fig. 1 to deflect any branches etc. inwardly as may be necessary to insure the proper downward movement of the envelope without catching against any portions of the tree, and also providing means to guide the envelope in its descent if necessary. The envelope having been lowered until it is supported by the uppermost branches or foliage the pole is withdrawn and the band 9 is taken off as illustrated in Fig. 2. This leaves the mouth of the envelope in its natural flexible condition, so that the draw cord 8 may then be pulled in to close the mouth as snugly as may be desired or feasible about the trunk of the tree. All the foliage and fruit of the tree are thus protected from the ravaging effect of frost or high winds and the envelope may be left on the tree for as long as may be necessary without being disturbed, since the translucent character of the envelope allows the light and heat of the sun to penetrate to the tree to promote the growth of the fruit. Each tree being individually enclosed by its envelope the air confined within said envelope is a relatively small volume and therefore it takes very little heat to raise the temperature of the same to the necessary degree. A much smaller fuel bill will therefore be had than is the case with the ordinary orchard heating methods, in which not only the air immediately surrounding the trees is heated but all that in between as well. The envelope being of paper is of course very light even though of large size so that it is easily handled and when supported by the tree does not bear down with sufficient pressure to distort or break any limbs which may be supporting it.

When the space between the trees is too narrow to permit of the fully extended mouth being initially placed between adjacent trees the band 9 after being applied to the envelope is drawn together to outline a relatively narrow and oblong instead of a circular area by means of cords or detachable catch elements as indicated at 14 in Fig. 6. These elements, when the envelope is then raised into position by one operator, are cut or removed by the other operator, as illustrated in Fig. 7. This permits the spring band to then expand to pull the mouth of the envelope to its natural circular or fully open shape, enabling the envelope to be lowered and fastened about the tree in the same manner as before.

In relatively old orchards the trees are frequently of such height as to render the above described method of raising the envelopes unfeasible. In such cases the arrangement illustrated in Fig. 8 may be employed. In such arrangement poles 15 approximately twice the height of the trees are mounted in alinement with the different rows and support wires 16 stretched therebetween above the trees of each row. Above each tree a pulley 17 is turnably mounted on the wire about which a cord 18 passes. One end of the cord is permanently attached to the eye 5 on top of the corresponding envelope, while the other end extends to the ground on one side of the tree. This structure enables the envelopes to be raised and lowered relative to the trees by means of the cord, the envelopes when raised being held clear of and in suspended relation to the trees. Before any envelope is thus raised the mouth opening band 9 must of course be reapplied so that the envelope after being raised is then in condition to be readily lowered about the tree without any delay when the occasion demands.

In this figure, I have shown envelopes of a number of different shapes, so as to illustrate the variations in form which may be made to suit different species of trees, without in the least altering the major features of construction or operation of the device.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A tree protecting device comprising a flexible envelope to be placed over and completely enclose the foliage bearing portion thereof, means for contracting the mouth of the envelope about the tree after said envelope is in position, and means removable relative to the envelope and tree for initially holding said mouth fully extended.

2. A tree protecting device comprising an envelope to be placed over and completely enclose the foliage bearing portion thereof, and means about and engaging the mouth of the envelope and removable relative to the envelope and tree for initially holding said mouth fully extended.

3. A tree protecting device comprising an envelope to be placed over and completely enclose the foliage bearing portion thereof, and a split spring band removably mounted in connection with the envelope adjacent its mouth to initially hold said mouth fully extended.

4. A tree protecting device comprising a flexible envelope to be placed over and completely enclose the foliage bearing portion thereof, a draw cord mounted in connection with the envelope about its mouth in a manner to form a plurality of exteriorly disposed loops, a split spring band to extend about the envelope at its mouth when said mouth is fully open, and lugs depending from the band to detachably engage the loops.

5. Means for raising a tree protecting envelope into place about a tree, said envelope having a top ring; said means comprising a manually supported pole, said pole having an angularly extending portion at its upper end whose length is not less than one-half of the width of the envelope and which terminates in a hook to detachably engage the ring.

In testimony whereof I affix my signature.

ROSCOE C. ZUCKERMAN.